United States Patent
Blum et al.

(10) Patent No.: US 12,499,239 B2
(45) Date of Patent: Dec. 16, 2025

(54) TREE-BASED SECURITY ANALYSIS AND THREAT HUNTING AIDED BY LARGE LANGUAGE MODELS

(71) Applicant: Microsoft Technology Licensing, LLC, Redmond, WA (US)

(72) Inventors: William Blum, Bellevue, WA (US); Martin Jean Fontaine, Gatineau (CA); Sébastien Martin Diotte, Gatineau (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 18/210,016

(22) Filed: Jun. 14, 2023

(65) Prior Publication Data
US 2024/0419803 A1 Dec. 19, 2024

(51) Int. Cl.
*G06F 21/57* (2013.01)
(52) U.S. Cl.
CPC ................. *G06F 21/577* (2013.01)
(58) Field of Classification Search
None
See application file for complete search history.

(56) References Cited

U.S. PATENT DOCUMENTS

2020/0104401 A1    4/2020   Burnett
2020/0104402 A1*   4/2020   Burnett ................. G06F 16/288

OTHER PUBLICATIONS

Caufield, et al., "Structured prompt interrogation and recursive extraction of semantics (SPIRES): A method for populating knowledge bases using zero-shot learning", In Repository of arXiv:2304.02711v1, Apr. 5, 2023, 19 Pages.
International Search Report and Written Opinion received for PCT Application No. PCT/US2024/032178, Sep. 30, 2024, 13 pages.

* cited by examiner

*Primary Examiner* — Syed A Roni
(74) *Attorney, Agent, or Firm* — Workman Nydegger

(57) ABSTRACT

A computing system assists in large language model system assisted investigations. The computing system includes network connection hardware configured to connect to a large language model and configured provide to investigation context and investigation goals to the large language model system. The network connection receives from the large language model system, an indication of suggested steps to perform in an investigation, including specific computer executable code to perform a skill in the first step, the skill comprising a supplemental access, analytic or enrichment function. The computing system includes a user interface with a tree interface that causes display of the indication of the suggested steps in a tree format. The computing system is configured to execute the computer executable code to cause the computer system to perform the supplemental access, analytic or enrichment function.

20 Claims, 13 Drawing Sheets

```
Provide a list of choices of possible next hunting steps to perform to make progress in the threat hunting investigation.  ⌐ 121
For each suggestion, produce the following items, where {INDEX} denotes the choice index.
 - ID:NEXT_STEPS_{INDEX} : A description of the next step to perform to make progress in the threat hunting investigation, without mentioning the
 - ID ::INVOKESKILL_{INDEX} : A one-line Python expression (to be evaluated with Python's 'eval' function) that   ⌐ 122
calls the most appropriate Python skill taken from the list above to help achieve the goal.
Important: invoke only skills that are listed under the 'Available skills' section.
Use the appropriate columns from matching the commented parameters of type DataTable.
Respect the typing of the Python skill arguments.
Only call skills by their name as defined above.
Specify values for all the skills parameters.
Assume that no Python module is loaded.
Do not pick a skill if there are missing values to pass for any of its required parameters.
only include the valid executable python expression without any text description before or after it .
Only pass parameter values that can be inferred from the stated context and goal, including the input pandas DataFrame variable '{{DataTableRef.
When invoking a skill taking a datatable as a parameter, make sure to select the correct set of columns expected by the skill parameter; if necessary
Only refer to documented columns of the provided DataFrame variable '{{DataTableReferenceFromPreviousStep.name}}' when doing column selection .
Do not generate invalid erronous calls .                                  ⌐ 125
You must generate a pandas expression that ends with columns selection on ' {{DataTableReferenceFromPreviousstep.name}}. For example:
{{DataTableReferenceFromPreviousstep.name}} [[ 'columnA', 'columnB']] where 'columnA' and 'columnB' are the columns expected by the skill.
DO NOT call any method on '{{DataTableReferenceFromPreviousstep.name}} '
Do not create GUID or identifiers that are not stated in either the context or the goal.          ⌐ 124
Only invoke skills from the list of available skills.
Produce a single Python expression, not a Python statement.
If you do not find a skill with the appropriate DataTable field types, then return the special skill NOP EXCEPTION
 - ID:INVOKESKILL_DESCRIPTION_{INDEX} : A description of the action performed by the skill invocation.   ⌐ 123
```

I am a SOC Analyst conducting an investigation. I am running a SOC Analysist. I was told to look at Sentinel alert with ID cd62b250-f176-4c0d-8aa4-06166cb0afbc.

The alert has a high severity and is of type WindowsDefenderAtp. It has no confidence score. It is related to a possible initial access via OneNote that occurred between 2023-02-27 19:30:36.901138900+00:00 and 2023-02-28 18:18:11.306903900+00:00. The compromised entity is workstation8.attimisrecords.com and the tactic is InitialAccess. The alert was generated at 6.

I want to perform a root cause analysis of the alert.

I executed the skill GetSentinelAlertEntities with the alert ID as the input parameter and got a data table with two columns: Description and entities. The table contains six rows of entities related to the alert. Each row has a description of the alert and a JSON object with the entity details. The entities include the process ONENOTE.EXE that was launched by the user banita on workstation8.attimisrecords.com with a OneNote attachment from the Downloads folder. The process has a limited elevation token and was created on 2023-02-27T19:30:15.1094781Z. The parent process is explorer.exe with known file hashes. The user banita is a domain-joined user with an AAD user ID 5d4b26d1-4e1b-4493-8824-f16cb62d293b and a user principal name banita@attimisrecords.com. The user has a display name Anita Bombu and belongs to the NT domain attimisrecords. The user has a SID S-1-5-21-123178640-1197785608-1465465807-10505. The workstation8.attimisrecords.com is a Windows device with OS version 21H2 and an MDATP device ID 13f45e104e8576d812ab2d91d06e2fb988c0cd52. The device has a high risk score and an active health status. The device has been seen with different external IP addresses (10.16.0.100 and 10.12.113.12) and an internal IP address 192.168.2.8. The device has an updated AV status and is onboarded to MDATP. The device has a tag AttimisrecordsDemo from the provider MDATP.

I want to use the entity information to identify the possible attack vector, the malicious activity, and the impact of the alert on the device and the user.

I executed the skill GetProcessCreationEvents with the start time, end time, account name, domain name, device name, file name, and command line content as input parameters to find any process creation events that match the criteria related to the alert.

I got a data table with seven columns: TimeGenerated, DeviceId, SubjectUserName, SubjectDomainName, NewProcessName, CommandLine, IpAddress. The table contains one row of data that corresponds to the process creation event of ONENOTE.EXE by banita on workstation8.attimisrecords.com with a OneNote attachment from the Downloads folder as part of the command line argument on 2023-02-27T19:30:15.109514500Z.

I want to use this data table to further analyze the process creation event and its relation to the alert.

*Figure 9*

TREE-BASED SECURITY ANALYSIS AND THREAT HUNTING AIDED BY LARGE LANGUAGE MODELS

BACKGROUND

When conducting an analysis, security operations center (SOC) analysts rely on a variety of techniques, tools, and processes to determine which step to execute next, which data source to query, which tools to use, and which forensics to conduct. Picking the next step to execute in a security investigation can be a challenge due to the limited information available at the start of the investigation, the complexity of the environment, the evolving threats, and time pressure. SOC analysts leverage their expertise, experience, and specialized tools and techniques to overcome these challenges and make informed decisions to detect, mitigate, and prevent security incidents. Multiple data sources, tools, and techniques are used to analyze the incident fully. To pick the next step to execute in a security investigation, analysts stay up to date with the latest specialized tools and techniques, and have a thorough knowledge of available data. They then use their best judgement to run data queries or use analysis tools to advance the investigation. Those typically involve intense context-switching between tools and data querying, with manual note taking. Backtracking is often performed when investigating, and this is typically implemented manually via copy-pasting and note taking. This can cause overhead and create possible confusion in the analysis.

Analysts are now using large language models (LLM systems) to perform investigations to alleviate some of the complexity and effort in using analysis methods. However, the LLM systems have some "holes" with respect to investigations. In particular, an LLM system is trained at a specific point in time on publicly available data. Thus, the trained model lacks recent public context and private contextual information. To compensate for these holes, so called 'skills', which are supplemental access, analytic or enrichment functions, are used in conjunction with LLM systems to perform investigations.

Skills accept arguments as input and produce output. Examples of skills include database queries, search engine searches, view generation operations, table generation operations, API calls, or other such operations which accept arguments and produce output.

As the list of skills grows, it becomes difficult for individuals to keep track of the various skills. In particular, it is humanly impossible for an individual to be aware of all possible skills and the functionality that each of these skills provides.

Another issue related to LLM systems relates to token budgets. Analysts may wish to extract important insights, summarize large volumes of data, etc. Analysts can also invoke deterministic database queries, API calls or classical programs. More specifically, database queries can be written in a data query language like SQL, KQL, Pandas, Python, etc., and result in large tabular result set retrieved from several database tables.

During an investigation, many prompts and data access operations will likely be sequentially combined. Information from previously executed prompts or data access operations are passed, as argument, to subsequent prompts.

Since LLM systems have an inherent token limit, limiting the amount of data that can be input into an LLM prompt, it is problematic to manipulate large data sets in prompts. Most data integration in LLM system prompts will copy/paste the entire data table in the prompt, at the risk of exceeding the token limit. Table compression and/or summarization techniques used to combat this risk of losing essential information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computing system that implements a user interface for assisting in large language model system assisted investigations. The user interface includes a user interface element for receiving investigation context and a user interface element for receiving investigation goals. The computing system includes network connection hardware connected to a large language model, and which provides investigation context and investigation goals to the large language model system. The network connection receives from the large language model system, an indication of suggested steps to perform in an investigation. The indication comprises a description of a first step; specific computer executable code to perform a skill in the first step, the skill comprising a supplemental access, analytic or enrichment function; and a description of what the computer executable code performs as a result of being executed. The user interface further includes a tree interface that causes display of the suggested steps in a tree format. The tree format includes a user interface element to expand steps, that as a result of being selected causes display of the description of the first step; the specific computer executable code to perform the skill in the first step; and the description of what the computer executable code performs as a result of being executed. The computing system executes the computer executable code to cause the computer system to perform the supplemental access, analytic or enrichment function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1B illustrates direction for the large language model;

FIG. 2 illustrates a user interface having elements for inputting context and goals;

FIG. 5 illustrates another example of the user interface including a treeview;

FIG. 6 illustrates another example of the user interface including rolling context, an output summary, and data in a data table;

FIG. 8 illustrates another example of the user interface including a treeview;

FIG. 9 illustrates cumulative context that is displayed in the user interface;

DETAILED DESCRIPTION

Embodiments illustrated herein take, as input parameters, a set of skills that are invoked to advance an investigation to remedy a security issue such as by identifying the security issue and/or removing the security issue. The skills can either pull external data relevant to the analysis such as security logs, or perform some computation, or analysis. One typical set of such skills that is useful for analysts run queries on security log databases, such as Kusto or Log Analytics, using a query language such as KQL or SQL.

The system comes with a user interface (e.g., text or graphical), including prompt templates, which represent the investigation as a tree where each tree node is a branching point in the investigation where a choice of a skill is made by the analyst. At each branching point in the tree, the system produces a set of possible next steps. These next steps are generated by the LLM system based on instructions fed to it via a prompt expressed in natural language. The prompt contains a description of the current state of the investigation (e.g., a summary of the path from the tree root to the node), a rolling summary of the current context, a description of the goal and a pre-filtered list of skills that are deemed relevant for the investigation, and instructions to the LLM system to produce suggested steps. The LLM system then produces a text output describing possible next steps to take in an easily parseable form. Note that at certain points, such as when passing data in a skill invocation or passing output into a prompt, large data sets may be represented by reference and/or description of the dataset (e.g., using a schema for the dataset).

Figure 1A:
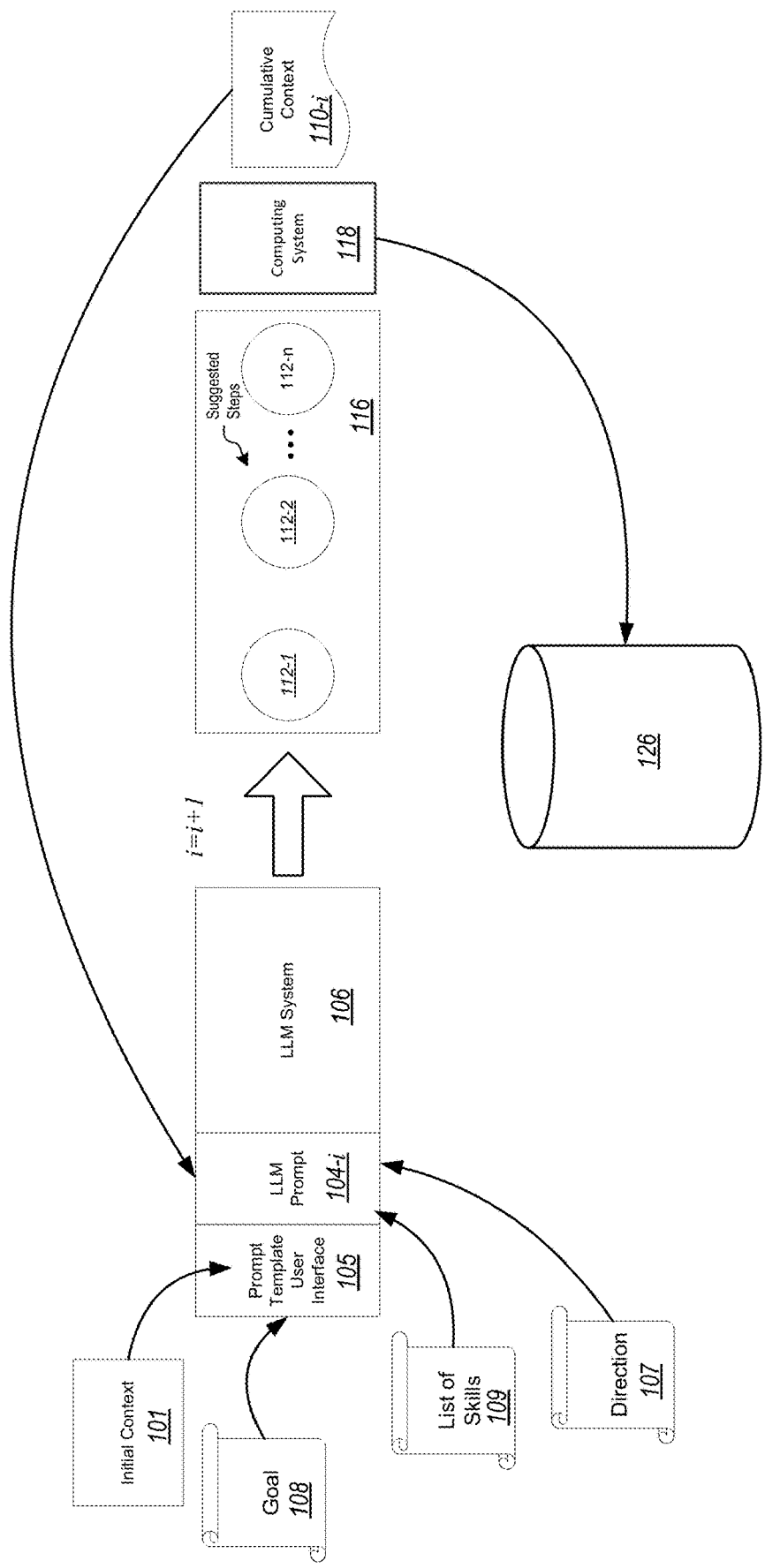
FIG. 1A illustrates a computing system interacting with a large language model system.

Additional details are now illustrated. Referring now to FIG. 1A, an example is illustrated FIG. 1A illustrates an LLM system 106. The LLM system 106 receives an LLM prompt 104-$i$ that can receive information, including goals, context, instructions, lists of skills, and other information.

The LLM prompt 104-$i$ receives information through a prompt template user interface 105. The prompt template user interface is provided by an external computing system 118 that is external to the LLM system 106, but interfaces with the LLM prompt 104-$i$ for the LLM system. In particular, the computing system 118 communicates over a network connection, using network connection hardware, with the LLM system 106. The prompt template user interface 105 communicates over a network connection with the LLM prompt 104-$i$. As noted, previous user interfaces with LLM systems required the analyst to maintain context, typically using manual note taking. Further, an investigation where backtracking was performed required manual copy and paste operations in the user interface. Embodiments illustrated herein improve over the previous systems by providing a user interface that automatically keeps and displays context as an investigation proceeds. Further, embodiments illustrated herein improve over previous systems by using external memory at, or coupled to, the computing system 118 to store context and results on a per step node basis, where a step node is a representation of a step in a graph, such that when backtracking is performed, the context and results are automatically fed back into the LLM system, rather than needing to perform tedious manual cut and paste operations.

Figure 2:
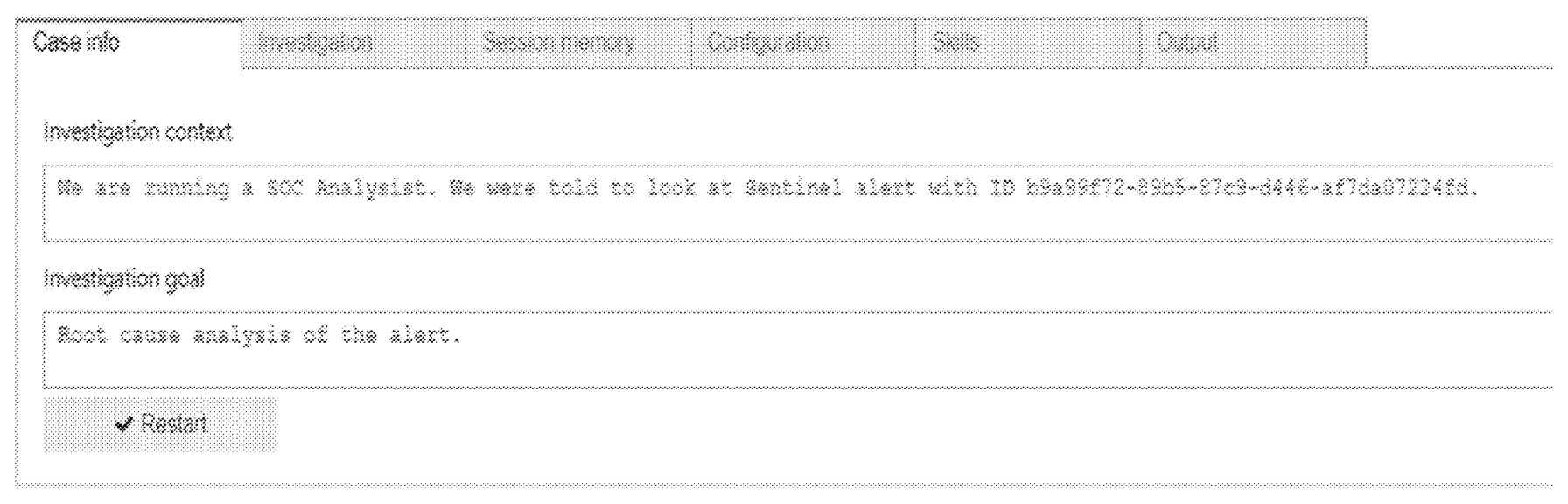

The LLM system 106 will use trained models or other artificial intelligence functionality to operate on information provided in the LLM prompt 104-$i$ to produce outputs. In the example illustrated in FIG. 1A, initial context 101 and a goal 108 is provided to the LLM prompt 104-$i$ through the prompt template user interface 105. The initial context 101 may provide context relevant to an investigation that is being performed. Context can be related to time, system state, artifacts or conditions observed, applications that are executing, alerts, etc. The goal 108 identifies the goal of an investigation. The goal may be a plain text description of what information is being sought by an investigation. For example, reference is now made to FIG. 2 which illustrates specific examples of initial context and a goal being entered into a user interface screen of the prompt template user interface 105.

Returning once again to FIG. 1A, the LLM system 106 also receives a list of skills 109 that can be suggested in suggested steps. The list of skills 109 represents a list of known skills relevant to the investigation. In some embodiments, the list of skills 109 may be selected from a broader set of skills where filtering is performed to remove skills from the broader set of skills so that only a limited set of skills is provided in the list of skills 109. For example, in some embodiments, an external computing system, such as the computing system 118 stores and accesses the broader set of skills. The computing system 118 may further have available matching criteria, such as ontological information from the initial context 101 (or cumulative context 110-$i$) and the goal 108, inasmuch as the prompt template user interface is provided by the computing system 118. This ontological information may be used to identify skills in the broader set of skills having the same or similar ontological information. For example, the ontological information may be related to ontological data types of input or outputs of the skill. Those skills in the broader set of skills having the same or similar ontological information to the context and/or cumulative context will be selected to be included in the list of skills 109 and are used by the LLM system 106 to produce suggested steps. Filtering skills may be done to comply with token restrictions, to minimize LLM hallucinations, and/or to minimize other errors.

The LLM system 106 also receives direction 107 through the LLM prompt 104-*i* to perform next suggested step analysis. The direction 107 may be provided by the computing system 118 and may include natural language instructions previously generated to accomplish the function illustrated herein when used with the LLM system 106. The direction includes direction on how to analyze context, goals, skills, and other information and output to provide. An example of direction is illustrated in FIG. 1B.

Figure 3:
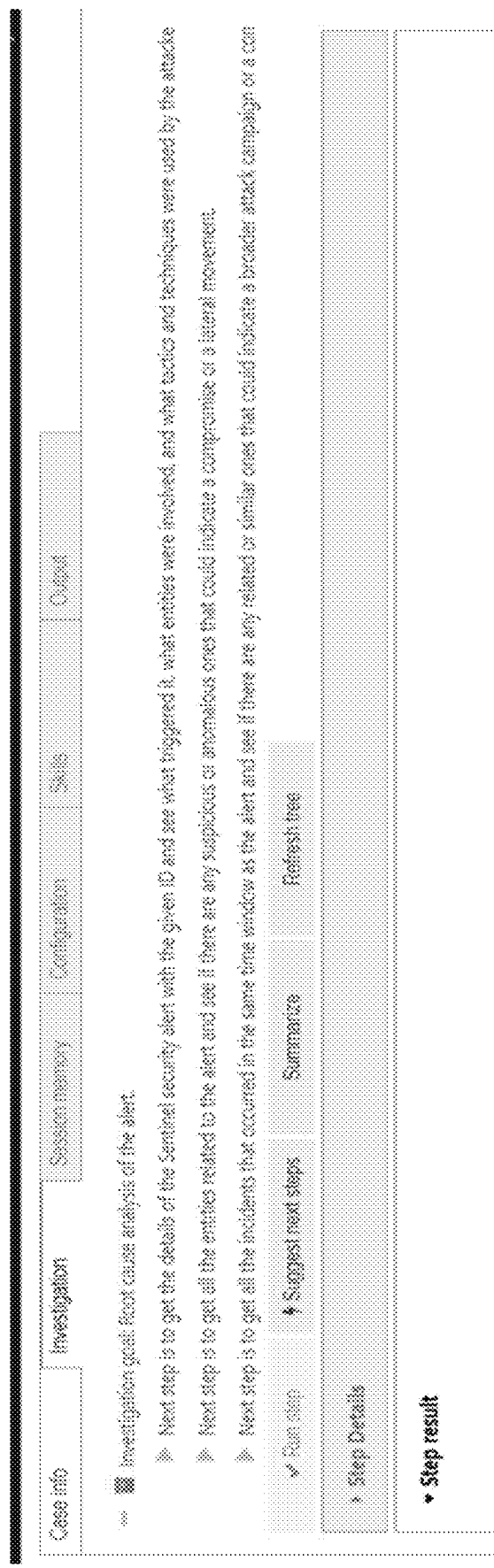
FIG. 3 illustrates the user interface including a treeview of a tree and step nodes.

The LLM system 106 performs analysis on the initial context 101, the goal 108, and the list of skills 109 according to the direction 107 to produce a set of suggested steps describing next steps that may be performed in an investigation. The suggested steps are provided to the computing system 118 over a network connection between the LLM system 106 and the computing system 118. Suggested steps comprise indications of skills (from the list of skills) that can be invoked. FIG. 1A and FIG. 3 illustrate the treeview control interface screen of the prompt template user interface 105 of the computing system 118 that provides suggested steps 112-1, 112-2 through 112-*n* as nodes in the tree represented by the tree view. Skills are data access, data analytics and/or data enrichment functions, such as database queries, search engine searches, view generation operations, table generation operations, API calls, or other such operations which accept arguments and produce output as a result of being executed on a computing system, such as the computing system 118. The suggested step will typically suggest skills pre-populated with appropriate arguments for a context and goal. The suggested step may be displayed, e.g., to an analyst, in a graphical user interface, as a treeview control interface screen 116 as illustrated in FIG. 3. Alternatively, or additionally, the suggested step may be printed in a text form for a console-based user interface. If none of the suggested steps are satisfactory, the analyst can request another set of recommendations to be generated, and the LLM system 106 will be called once again to produce a new batch of step suggested steps.

Note that the LLM system 106 identifies recommended steps in some embodiments, by using input, i.e., the list of skills 109, indicating what is possible to infer. This is supplemented with what makes sense to do next based on artificial reasoning of the LLM system 106.

Figure 4:
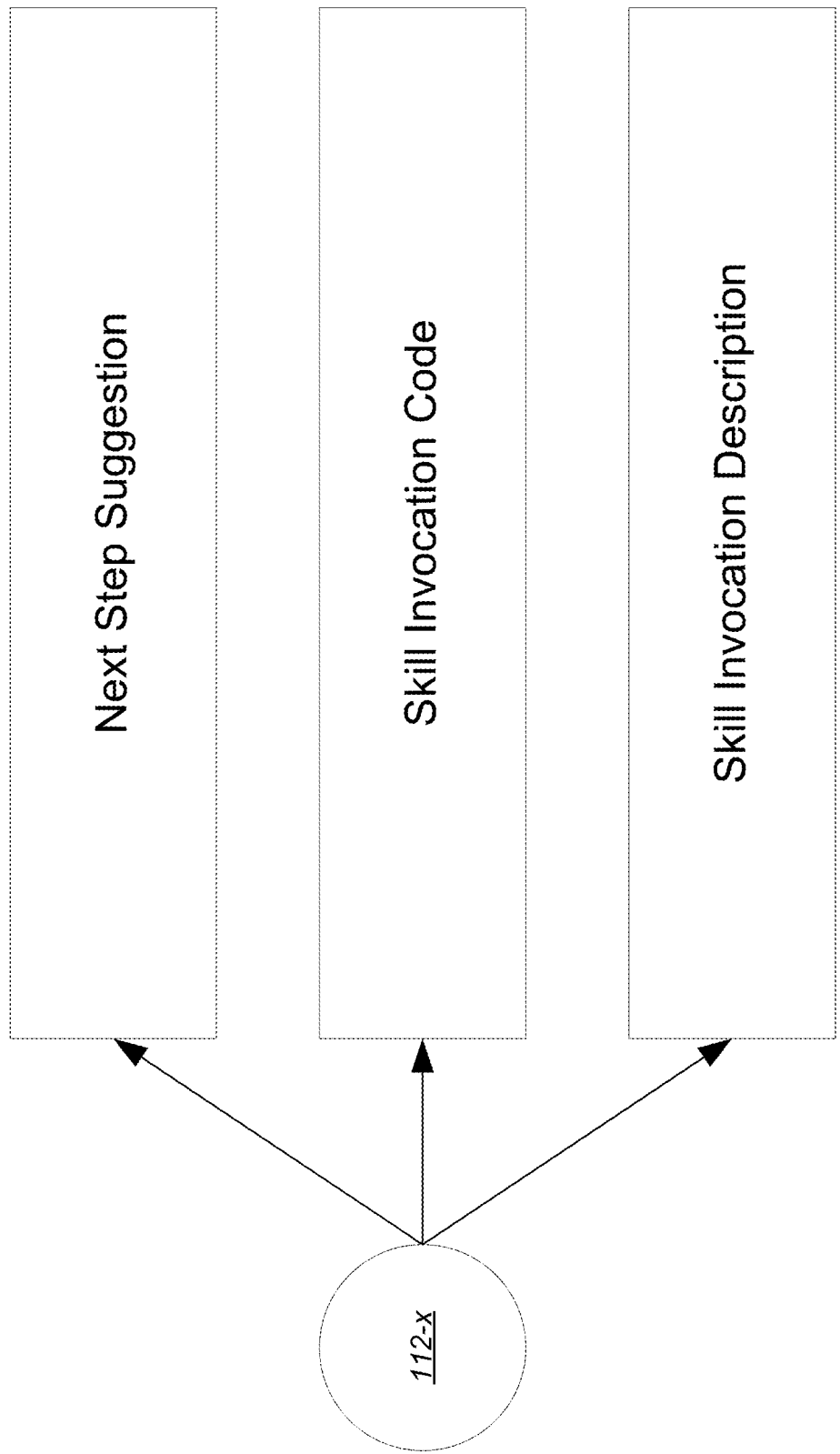
FIG. 4 illustrates a graphical representation of a suggested step.
Figure 5:
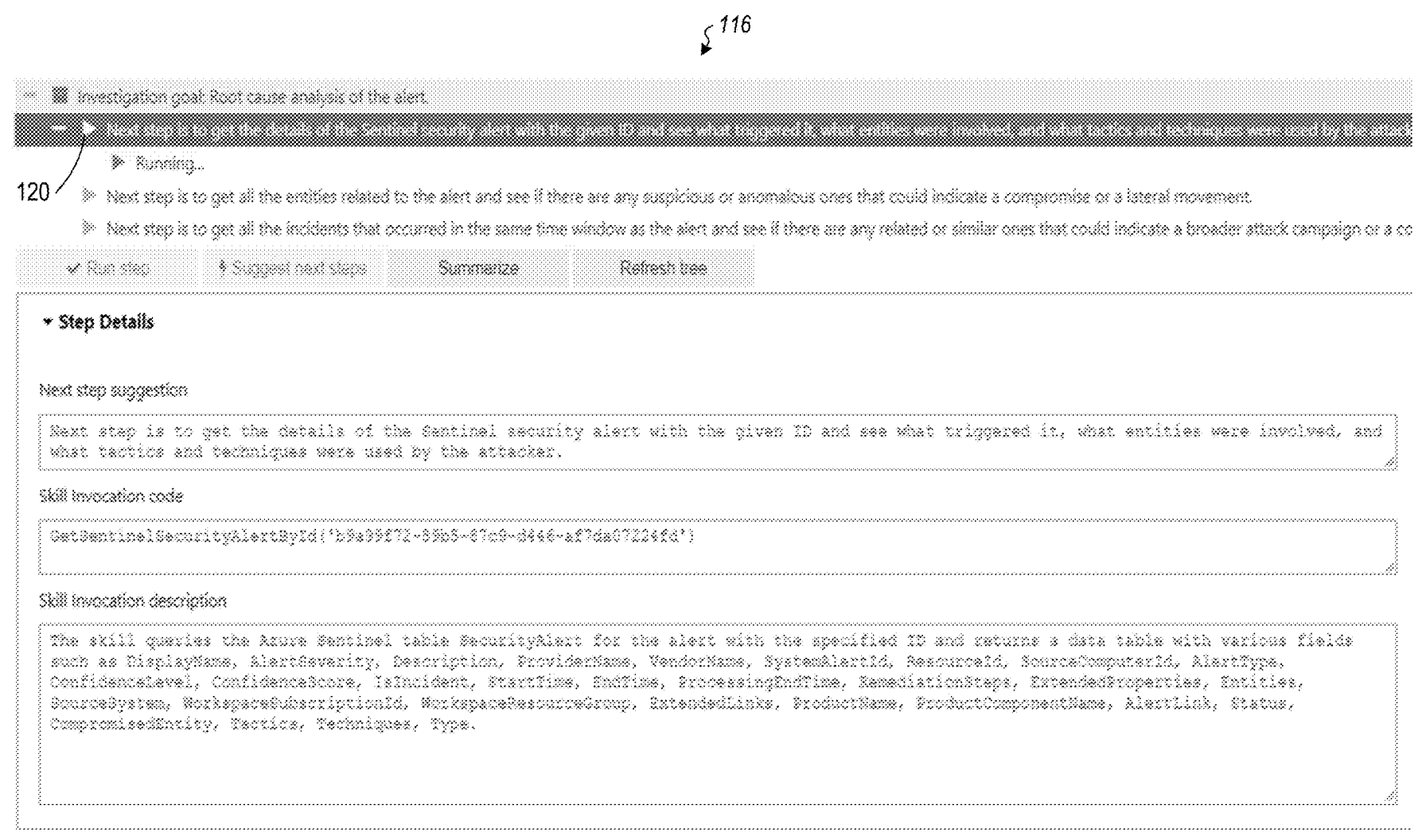

A suggested step includes: (1) a text description of what should be performed next in the investigation; (2) computer executable code (in any adequate language), including prepopulated input parameters, that is executed to execute a skill from the list of available skills that will attempt to achieve the suggested step; and (3) a text description of what the computer executable code invocation performs. For example, FIG. 4 illustrates a suggested step 112-*x* and associated information. FIG. 5 illustrates an example in the treeview control interface screen 116 with appropriate interface elements expanded to show specific details of one example. In the example illustrated in FIG. 5, selecting the step causes the next step suggestion, skill invocation code, and the skill invocation description to be displayed. Returning once again to FIG. 1B, an example of instructions in direction provided to the LLM system used to cause the LLM system to create the step information is illustrated. Instruction 121 is used to prompt the LLM system to create a text description of what should be performed next in the investigation. Instructions 122 are used to cause the LLM system to create skill invocation code (in this example, in Python) that an analyst invokes to execute a skill from the list of available skills that will attempt to achieve the suggested step. Instruction 123 is used by the LLM system to create the text description of what executing the skill invocation code performs. As illustrated, these instructions provide plain language input into the LLM system 106 identifying the type and format of output to be generated by the LLM system. The LLM system then uses trained models of the LLM system, context, goals, and available skills to apply the plain language instructions to create the desired output.

Note that occasionally the LLM system 106 may identify a next step suggestion but may not be able to identify skill invocation code because a skill does not exist to perform the next step suggestion. In these cases, the computing system 118, using the prompt template user interface 105 indicates to an analyst that a skill for accomplishing the next step suggestion does not exist. Note that otherwise, the LLM system 106 may hallucinate whereby the LLM system 106 suggests skills that simply do not exist. By prompting the LLM system 106 to indicate when skills don't exist, these hallucinations can be avoided. Attention is directed to FIG. 1B where an instruction 124 is included in the direction 107 to cause the LLM system 106 to not hallucinate, but rather to indicate that a skill is not available. The analyst can then request that a skill be developed. In another embodiment, the computing system 118 can indicate to a centralized repository that certain skills do not exist as suggestions of skills to be developed.

Figure 6:
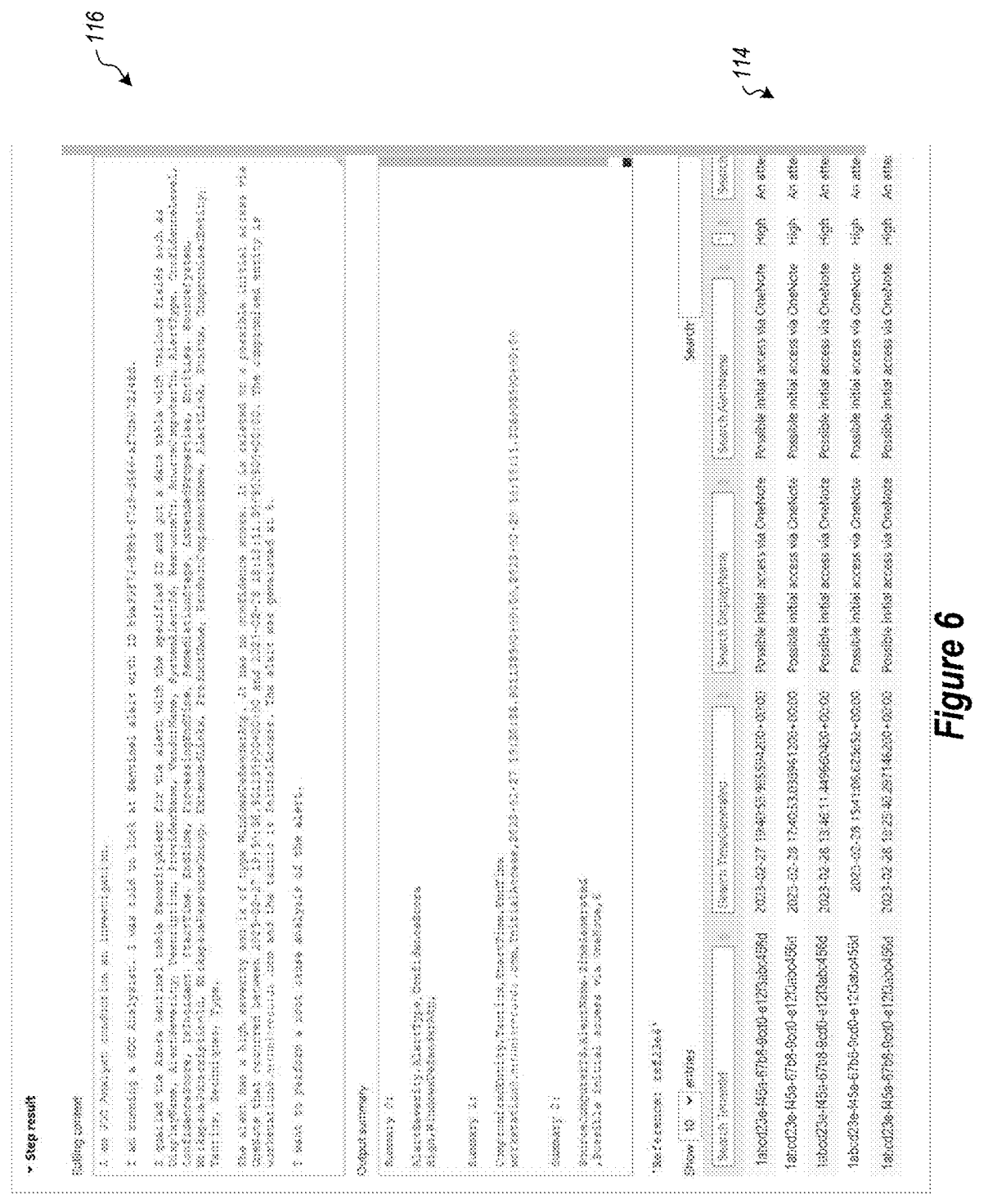

Returning once again to examples where suggested steps with appropriate skills have been proposed, the analyst then indicates that a selected step from among the suggested steps should be executed and the computing system 118 executes the selected suggested step by calling the skill invocation code. For example, FIG. 5 illustrates a user interface element 120, selection of which indicates that the executable skill invocation code in the associated step should be executed. The computing system 118 includes the prompt template user interface 105 for receiving invocation instructions to execute the skill invocation code for the selected step and to provide feedback via the prompt template user interface 105. FIG. 5 illustrates the treeview control interface screen 116 state, which is part of the prompt template user interface 105, after the analyst has selected a suggested step for skill invocation code execution. In particular, FIG. 5 illustrates that the selected step is running, meaning that the computing system 118 is executing skill invocation code for a step as appropriate. A given suggested step often involves executing one or several nested skills. The output of the executed step is displayed to the analyst. FIG. 6 illustrates a graphical user interface showing a selected step result, including portions of an example output 114. Such output may be, for example, a table of rows and columns returned by a log query, the result of a lookup from an external API, a web search, the result of an analysis or ML classification or generative model, etc.

After executing a step, the LLM system 106 generates new context for a node for the step in a tree. As illustrated in FIG. 1A, the new context is a cumulative context 110-*i* including information created by the LLM system 106 from previous contexts used in the investigation, as well as newly generated context. In particular, the cumulative context 110-I, in some embodiments, is generated by prompting the LLM system 106 to produce summarized context using previous context and newly generated context. Thus, rather than simply combining the various contexts, the cumulative context 110-*i* may be a summary. This may be done to keep only the most relevant information in a rolling context. Alternatively, or additionally, this may be done to keep the context sufficiently small so as to comply with token limits of the LLM system 106. The cumulative context 110-*i* is stored in storage 126. Note that as illustrated below, cumulative contexts may be stored as deltas, such that a given cumulative context includes portions of generated contexts generated from executing various steps in a branch. In some embodiments, storage 126 may store full context generated by execution of a given step, associated with the step. This can be used for other summarization processes or to allow the analyst to view a full context later if desired. The cumulative context 110-*i* is looped back to the prompt template user interface 105 and the LLM prompt 104-*i* for entry in the LLM system 106 to recursively explore and create additional suggested steps, and thus nodes for the tree branch.

Note that a skill node has its own associated memory containing results of the skill executed at that node. FIG. 1A illustrates storage 126 stores results in memory. The memory for a step node will contain cumulative context, skill output, data table summarizations, branch summarizations, etc. In some embodiments, the memory may store a delta from a parent node. Thus, for example, with reference to FIG. 7, memory for the step 112-1-3 will store any information that is different than that for step 112-1, while intentionally not storing information in the memory for step 112-1. Rather, information for step 112-1 will be stored in a memory for that step. Information in different memories for different steps can be combined to create the full cumulative information.

Note that as illustrated above, recursive looping is performed where cumulative context is provided for subsequent node creation. As described above, executing a skill may result in a table, view, search result being generated. Some of these tables, views, or search results will exceed the token budget for the LLM system 106. That is, LLM systems have a limit to the amount of information that can be input into an LLM prompt. Attempting to put a large table, view, or search result into a prompt may cause the token limit to be exceeded. Thus, embodiments illustrated herein may address this limitation by providing references to memory, in the storage 126, where a table, view, or search result is stored to a LLM prompt, rather than providing the table, view, or search result itself to the LLM prompt.

Embodiments further include functionality where the computing system 118 will prompt the LLM system 106 to generate relevant "aggregation queries" to summarize the table, view, or search result into a summary. For example, the LLM system 106 may be prompted to generate a SQL, KQL, Pandas, Python, etc. query that summarizes the table, view, or search result. The computing system 118 runs the aggregation query on the table, view, or search result to produce the summary. Summaries can be in lined into subsequent LLM prompts as needed. Additional details with respect to summarization are illustrated below.

Subsequent step suggestions will suggest skills where input parameters are in the form of a memory reference, of a table, view, or search result rather than the table, view, or search result itself contained in the referenced memory. Parameters may also include summaries generated by the summarization process above.

Further, the LLM system 106 uses previous results in generating next suggested steps. To obtain accurate results in generating next steps, embodiments provide a table schema for a table stored in memory for a given step to the LLM prompt 104-*i* for the LLM system 106 to generate next steps. Thus, for example, for a table generated by executing step 112-1-3, a schema of the table is provided to the LLM prompt 104-*i* and the LLM system 106 for use in generating the set of next steps including step 112-1-3-2. The schema may be generated by a helper skill implemented at the computing system 118, which generates schemas of resultant tables, views, and search results. By using the schema, the LLM system 106 is able to infer accurate next suggested steps. Indeed, using schemas and references to full tables improves over previous systems which would summarize resultant data, as summarizing would necessarily result in loss of fidelity of the data. Instead, embodiments illustrated herein preserve the fidelity of the data by storing the total result in the storage 126 and providing references to the data to the LLM prompt 104-*i*, so as to not exceed token size, while also providing schemas to the LLM prompt 104-*i* to allow the LLM system 106 to accurately identify next suggested steps. A next suggested step will therefore include suggested skill invocation code with a reference to data. Such a reference may include a reference to a set of data, such as a reference to a table, view, search results, etc. The next suggested step will optionally specify selected fields as specified by a schema reference. For example, a column or row from a table schema may be specified to specify specific data in the data referenced.

FIG. 1B illustrates an instruction 125 that is used to generate a suggested step that uses references to tables rather than the entire table itself. In particular, such instructions will specify references to table results from previous steps. The instruction 125 produces a next suggested step having the following skill invocation code:

NetcapplanForIp(startTime='2023-06-14', endTime='2023-06-15', argumentTable=ref004b[['DstIpAddress']])

In this example, "ref004b" is a reference to a previously generated table, and "DstIpAddress" is the selected field from a data table schema for the generated table.

Large data tables, results of data access operations, are kept in an out-of-prompt memory at the storage 126 that is shared between prompts used in an investigation. While in-lining the entire data table in a prompt is possible (when small enough to meet token limits), embodiments also include functionality allow to passing a data table "by reference". A data table reference points to the entire result set in the out-of-prompt memory in the storage 126.

LLM system instructions are engineered and stored by the computing system 118 so that as a result of being provided in the LLM prompt 104-*i*, along with current context and goals, the LLM system 106 automatically generates the adequate skill invocation code to manipulate a referenced data table. To help the LLM system 106 in accurately generating the skill invocation code to manipulate the referenced data tables, schemas can be obtained by the computing system 118 where data tables are stored, and the schemas are provided by the computing system 118 to the prompt 104-*i*.

Embodiments can store prompt instructions to be entered into the LLM prompt where the instructions are designed to generate table manipulation code to achieve functions to combine prompts in an integrated investigation system. Here are a 2 concrete examples:

(1) When chaining several prompts intertwined with data access operations. A prompt instruction may recommend a data access operation, which will result in a large data table. The next prompt instruction may recommend another data access operation, taking its query arguments from the previous large data table. In that case, the prompt instruction will be engineered to generate the code to filter and select the appropriate rows and columns that are required to make the next data access operation. All of this is done without in-lining the table in the prompt. That is, the computing system 118 may store various prompt instructions to table manipulation that can be provided to the LLM system to cause the LLM system to generate skills with computer executable instructions to manipulate data in the tables. Thus, the LLM system can be instructed to cause manipulation of data, without actually having to have access to the data itself.

(2) When extracting insights or summarizing a large data table. Instead of in lining the entire data table in the prompt, embodiments of the computing system 118 have available prompt instructions to prompt the LLM system 106 to generate the adequate summarization expression, which can then be executed by the computing system 118, needed to compress the large data table. Applying the summarization code to the table reference results in a smaller table that can fit under the token limit of the LLM prompt. The LLM system 106 can infer the adequate summarization code provided a textual context, investigation goal, and a schema of the table. In particular, the LLM system 106 can generate a query, such as a SQL, KQL, Pandas, Python, or other query based on inferences as to what data in the table might be relevant to the current context of an investigation and the investigation goal. Using the schema, appropriate query parameters can be generated by the LLM system 106 for the query. As noted, the query is then provided to the computing system 118, where it can be executed to generate a summary that can be fed back into the LLM prompt on subsequent iterations of an investigation.

Figure 7:
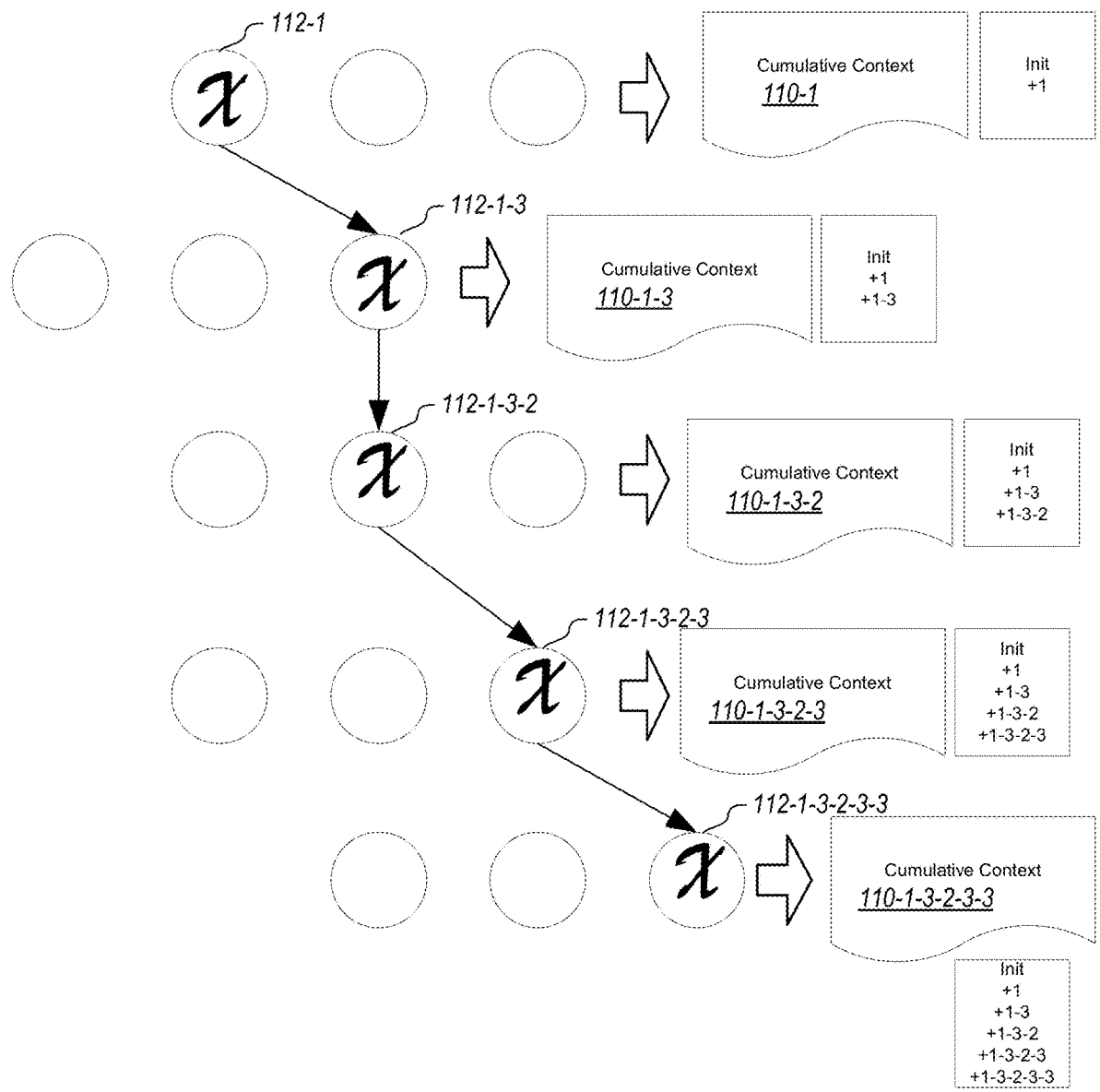
FIG. 7 illustrates a graph of step nodes for an investigation of a branch.
Figure 8:
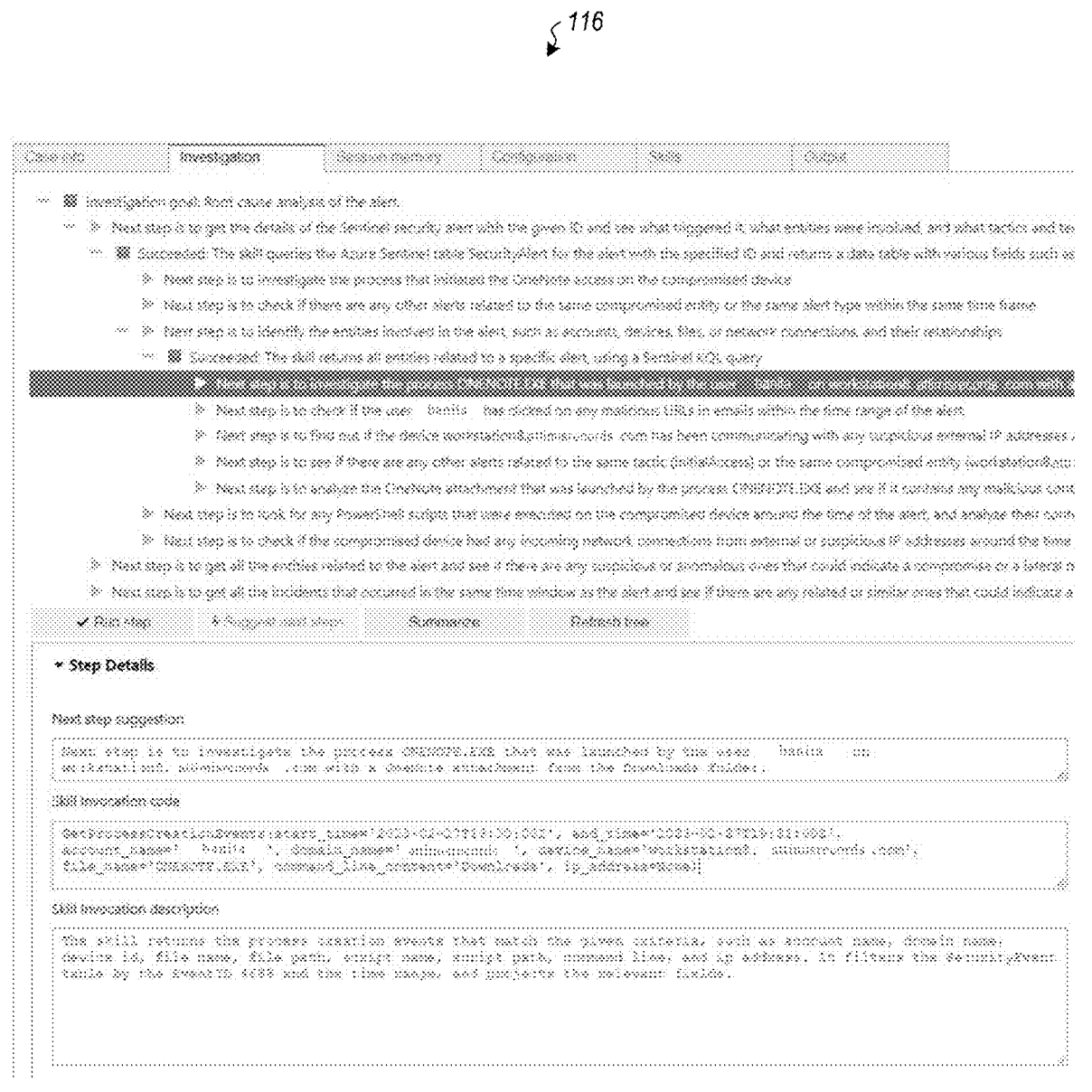

FIG. 7 illustrates an example of investigation of a tree branch, including investigation of 5 levels of the tree branch. In particular, FIG. 7 illustrates that the investigation has proceeded from step 112-1, to step 112-1-3, to step 112-1-3-2, to step 112-1-3-2-3, to step 112-1-3-2-3-3. FIG. 8 illustrates the treeview control interface screen 116 view of the tree after 3 levels of investigation of a branch.

FIG. 7 further illustrates various examples of cumulative context. For example, the cumulative context 110-1 associated with invocation of the step 112-1 includes context summarized from: the initial context 101 and the context created by executing the step 112-1. This context 110-1 is then provided back to the LLM prompt 104-i and the LLM system 106, where it is used to generate the suggested steps including step 112-1-3. Executing step 112-1-3 causes additional context to be created. The step 112-1-3 is associated with cumulative context 110-1-3 summarized from: the initial context 101, the context generated by executing step 112-1, and the context created by executing step 112-1-3. This context 110-1-3 is then provided back to the prompt template user interface 105 where it is provided to the LLM prompt 104-i and the LLM system 106, where it is used to generate the suggested steps including step 112-1-3-2. Executing step 112-1-3-2 causes additional context to be created. The step 112-1-3-2 is associated with cumulative context 110-1-3-2. The cumulative context 110-1-3-2 is summarized from: the initial context 101, the context generated by executing step 112-1, the context generated by executing step 112-1-3, and the context created by executing the step 112-1-3-2. This context 110-1-3-2 is then provided back to the LLM prompt 104-i and the LLM system 106, where it is used to generate the suggested steps including step 112-1-3-2-3. Executing step 112-1-3-2-3 causes additional context to be created. The step 112-1-3-2-3 is associated with cumulative context 110-1-3-2-3. Cumulative context 110-1-3-2-3 is summarized from: the initial context 101, the context generated by executing step 112-1, the context generated by executing step 112-1-3, the context generated by executing step 112-1-3-2, and the context created by executing the step 112-1-3-2-3. This context 110-1-3-2-3 is then provided back to the LLM prompt 104-i and the LLM system 106, where it is used to generate the suggested steps including step 112-1-3-2-3-3. Executing step 112-1-3-2-3-3 causes additional context to be created. The step 112-1-3-2-3-3 is associated with the cumulative context 110-1-3-2-3-3. The cumulative context 110-1-3-2-3-3 is summarized from: the initial context 101, the context generated by executing step 112-1, the context generated by executing step 112-1-3, the context generated by executing step 112-1-3-2, the context generated by executing step 112-1-3-2-3, and the context created by executing the step 112-1-3-2-3-3. FIG. 9 illustrates cumulative context in the treeview control interface screen 116 after the three steps executed in FIG. 8. Summarization of context can be performed by the computing system 118 prompting the LLM system 106 to summarize context based on investigation goals and previous context (whether summarized or otherwise).

The cumulative context is stored in storage 126 in memory correlated with executed steps (and in some embodiments, as illustrated above, in a delta format). This allows the cumulative context to be used in a rollback scenario, or other appropriate scenario.

Figure 10:
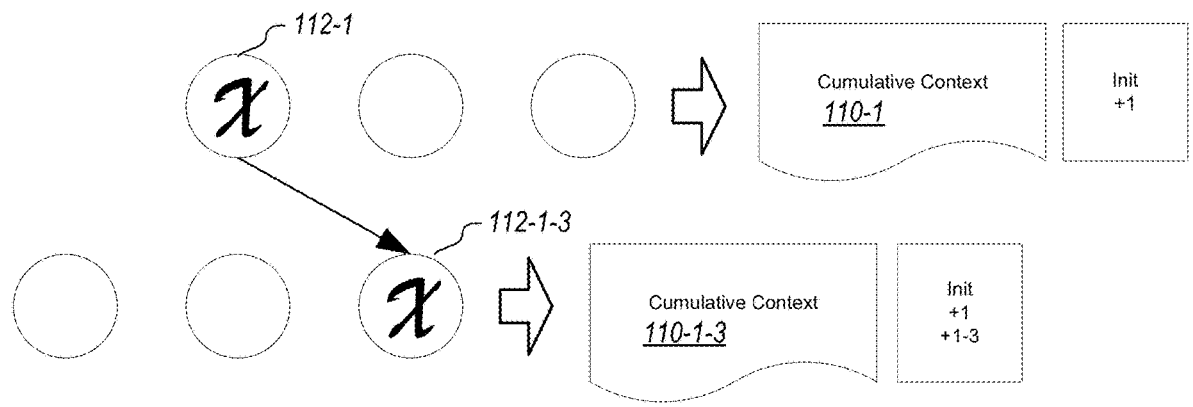
FIG. 10 illustrates a graph for when the investigation has been rolled back.

Note that embodiments include functionality in the treeview control interface screen 116 where an analyst can rollback, or switch to other branches. The rollback and switch functionality allows the analyst to reuse previous context when trying other avenues of an investigation, while eliminating context not relevant to the investigation. As noted previously, the illustrated examples improve over previous systems by maintaining the context rather than requiring a user to cut and paste previous contexts into an LLM prompt. For example, FIG. 10 illustrates an example of rolling the investigation back to step 112-1-3. Context provided to the prompt template user interface 105 is also rolled back to the cumulative context 110-1-3 (which is provided to the LLM prompt 104-i and the LLM system 106 in an iterative fashion as shown), while context produced by steps 112-1-3-2, 112-1-3-2-3, and 112-1-3-2-3-3 is elided for continuing the investigation.

Figure 11:
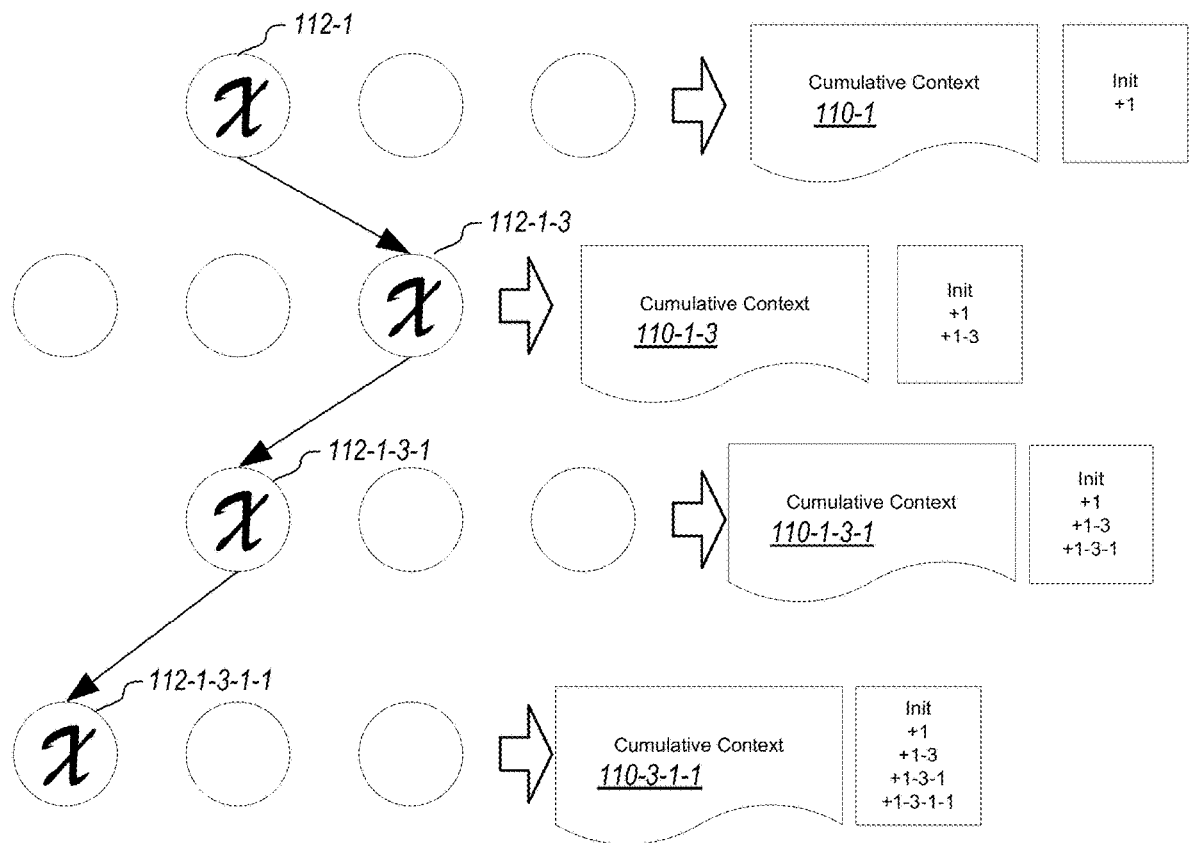
FIG. 11 illustrates a graph for a new branch for the investigation.

FIG. 11 illustrates an example of continuing the investigation from step 112-1-3 to step 112-1-3-1 and further to step 112-1-3-1-1 creating cumulative context 110-1-3-1 and cumulative context 110-1-3-1-1, respectively.

FIG. 8 illustrates various nodes of the treeview user interface control that can be selected to rollback or switch investigation context. In particular, an analyst can select a step that has previously been executed, and from there, follow a different investigation path. Note that other embodiments may use a command-line interface for a text-based user interface. Note that when a step is executed, skills are executed as part of executing the step.

As a result of the analyst is satisfied with a given branch, it can ask the LLM system 106 to produce a text summary of the investigation. For example, consider the following prompt template to the LLM system 106:

```
prompt: |-
  # Context
  {{Context}}
  # Goal
  {{Goal}}
  # Extracted entities
  {{InitialEntities}}
  # Steps executed
  {{BranchSteps}}
  ===================
  Summarize the investigation and produce a report in Markdown highlighing
the key facts and entities in bold.
  Only include entity names and identifiers (e.g., IP adresses, machine
names, user names, ports, ...)
    that are found in the provided data samples from the executed steps.
    In case of missing data, do not extrapolate and do not invent entities that
are not listed in the outputs.
```

This prompt may be provided by the computing system 118 to the LLM prompt 104-*i*. In particular, natural language summarization instructions may be stored at the computing system and provided automatically to summarize an investigation at various points or as a result of being requested by an analyst. A summarization prompt may include, for example, a enumeration of all nodes in a branch path to the root of the path; summarizations of data tables or other data, the investigation goal, cumulative context generated during the investigation, initial entities (where entities are specific instances of data, such as those provided initially in an investigation or those discovered by executing steps).

In some embodiments, the computing system 118 uses the LLM system 106 and produces micro summaries of each result obtained along the path from a tree root to a selected node. The technique used to summarize each node depends on the datatype of the output. Generic text output is summarized using a large language model summarization prompt. For large content embodiments can use a map-reduce technique to handle the token limitations of LLM systems. For other datatypes, plugins can be defined and configured in the computing system 118 to provide appropriate prompt instructions. To produce a branch summary, the system aggregates appropriate micro summaries and uses a final LLM prompt to produce the final natural language summary that may include snippets from datasets and content collected during the investigation.

As illustrated above, embodiments present an investigation as hierarchical structure view of the investigation that expands as it's being conducted. This allows the SOC analyst to focus on taking decisions on what to execute next without the need to drill down into the specifics of how to run a given tool or author a given log query. Further, the user interface illustrated herein is an improvement over previous interfaces that required the user to manually track context and perform manual cut and paste operations for navigating an investigation. Embodiments facilitate backtracking: the SOC analyst can now just pick a node in the tree to backtrack or switch back to a previous investigation branch, with context and results being automatically populated in the user interface.

The use of large language models to generate possible next steps significantly reduces the search space of actions to take. The system can also automatically onboard new analytics, tools or data access skills. It also reduces the required knowledge of tools and databases that analysts would otherwise have to be trained on to successfully conduct the investigation. This strikes an optimal trade-off between leveraging the ability of LLM systems to understand text-description of context and goals to achieve with the accuracy and precision of existing threat investigation and data querying tools.

Figure 12:
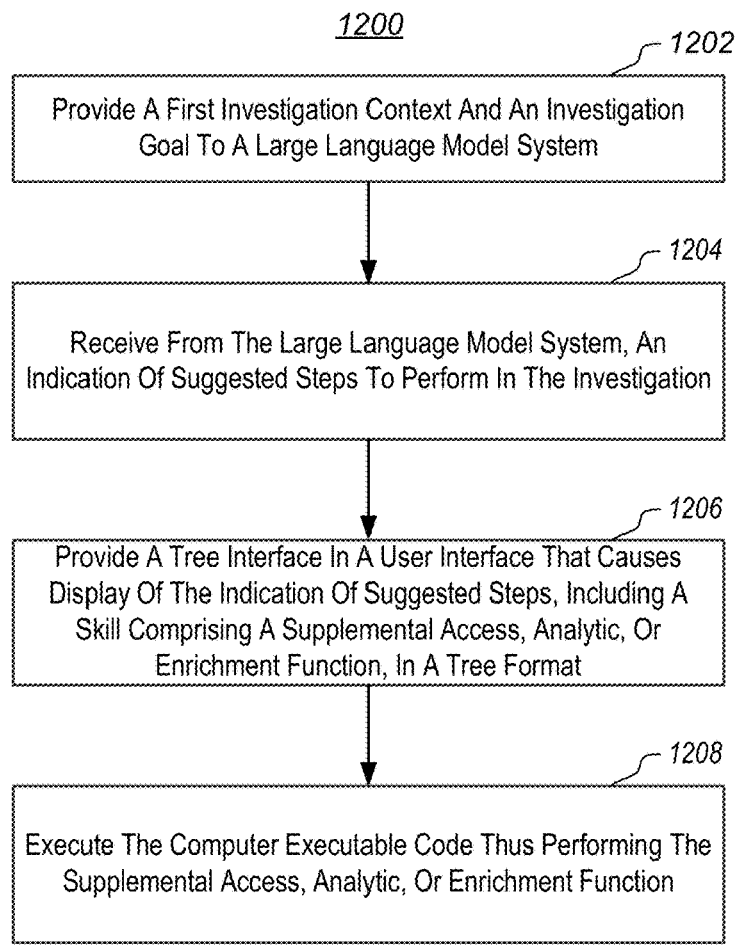
FIG. 12 illustrates a method of large language model assisted skill execution.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Referring now to FIG. 12, a method 1200 is illustrated. The method 1200 includes providing a first investigation context and an investigation goal to a large language model system (act 1202).

The method 1200 further includes receiving from the large language model system, an indication of suggested steps to perform in the investigation (act 1204). The indication includes a description of a first step; specific computer executable code that as a result of executed performs a skill in the first step; and a description of what the computer executable code performs as a result of being executed. The skill is a supplemental access, analytic or enrichment function.

The method 1200 further includes providing a tree interface in a user interface that causes display of the indications of suggested steps in a tree format (act 1206) The tree format includes an expansion user interface element, that as a result of being selected by a user causes display of the description of the first step; the specific computer executable code that as a result of being executed performs the skill in the first step; and the description of what the computer executable code performs as a result of being executed.

The method 1200 further includes executing the computer executable code to cause a computer system thus performing the supplemental access, analytic or enrichment function (act 1208). Executing the computer executable code may occur automatically, or as a result of a user selecting the step in the tree interface.

The method 1200 may further include providing a user interface element for receiving investigation context and a user interface element for receiving investigation goals. The first investigation context is received at the user interface element for receiving investigation context and the investigation goal is received at the user interface element for receiving investigation goals.

The method 1200 may further include receiving first generated context generated by the large language model system as a result of executing the computer executable code. First cumulative context, based on the first generated context and the first context is provided to the large language model system. An additional indication of additional suggested steps to perform in the investigation is received from the large language model system. The additional suggested steps are displayed in the tree interface as tree branches from the first step. In some such embodiments, the method 1200 may further include causing display of the first generated context together with the first context in the user interface.

The method 1200 may further include providing the first generated context and the first generated context to the large language model system and prompting the large language model system to generate the first cumulative context. The first cumulative context is received from the large language model system.

Embodiments of the method 1200 may further include performing branch switching by receiving user input selecting a second step from the suggested steps and executing computer executable code for the second step. Second generated context generated by the large language model system as a result of executing the computer executable code for the second step, is received. Second cumulative context based on the second generated context and the first context is provided to the LLM system (while excluding the first cumulative context so as to perform an appropriate backtrack). An additional indication of additional suggested steps to perform in the investigation is received and displayed in the tree interface as tree branches from the first step.

Embodiments of the method 1200 may be practiced where executing the computer executable code causes data output to be created. In some such embodiments, the method 1200 further includes storing the data output in a memory associated with the first step and providing a schema for the data output to the large language model system. In this example, a third step in the additional suggested steps comprises third executable code including a reference to the data output generated based on the schema. Some such embodiments may further cause the large language model system to create a query expression to summarize the data output, based on the investigation goal, the first cumulative context, and a schema for the data output. The query expression is executed to cause the data output to be summarized. This data summarization can be used to comply with token limits for the large language model system. Note that the query expression may be, for example SQL, KQL, Pandas, Python, etc.

The method 1200 may further include providing, to the large language model system, a filtered list of skills and direction. The direction includes natural language instructions on how the large language model system should analyze the filtered list of skills, first investigation context, and investigation goal. In some such embodiments, the method of claim 8, further comprising, creating the filtered list of skills by using ontological information from the first investigation context to match ontological context to skills in a broader set of skills.

The method 1200 may further include providing references to a plurality of different data sets to the large language model system. In particular, the data itself is not provided to the large language model system. This may be done to comply with token limits of the large language model system, or for other reasons. Schemas for the plurality of different data sets are provided to the large language model system. Instructions are provided to the large language model system to generate computer executable instructions to manipulate data in the plurality of different data sets. The specific computer executable code to perform the skill in the first step includes references to the data sets in the plurality of different data sets. In this fashion a large language model system can effectuate manipulating data without actually having access to the data itself.

The method 1200 may further include, prompting the large language model system to generate a summary for the investigation, including providing context, the investigation goal, entities, and steps executed in the investigation. The method includes receiving from the large language model a summary of the investigation. The method includes causing display of the summary of the investigation in the user interface.

The method 1200 may further include providing instructions to the large language model system to not hallucinate. This will prevent the large language model from providing steps with skills that do not exist. The large language model can, however, indicate a skill that should be developed as a result of what would otherwise be a hallucination.

The method 1200 may further include storing instances of generated context, generated as a result of steps being executed, in memories for the steps. In some embodiments, the memories store context as deltas from parent nodes. Some embodiments may further include storing skill outputs for the skills in the memories. Some embodiments may further include storing data table summaries in the memories.

Further, the methods may be practiced by a computer system including one or more processors and computer-readable media such as computer memory. In particular, the computer memory may store computer-executable instructions that as a result of being executed by one or more processors cause various functions to be performed, such as the acts recited in the embodiments.

EXAMPLE COMPUTER/COMPUTER SYSTEMS

Figure 13:
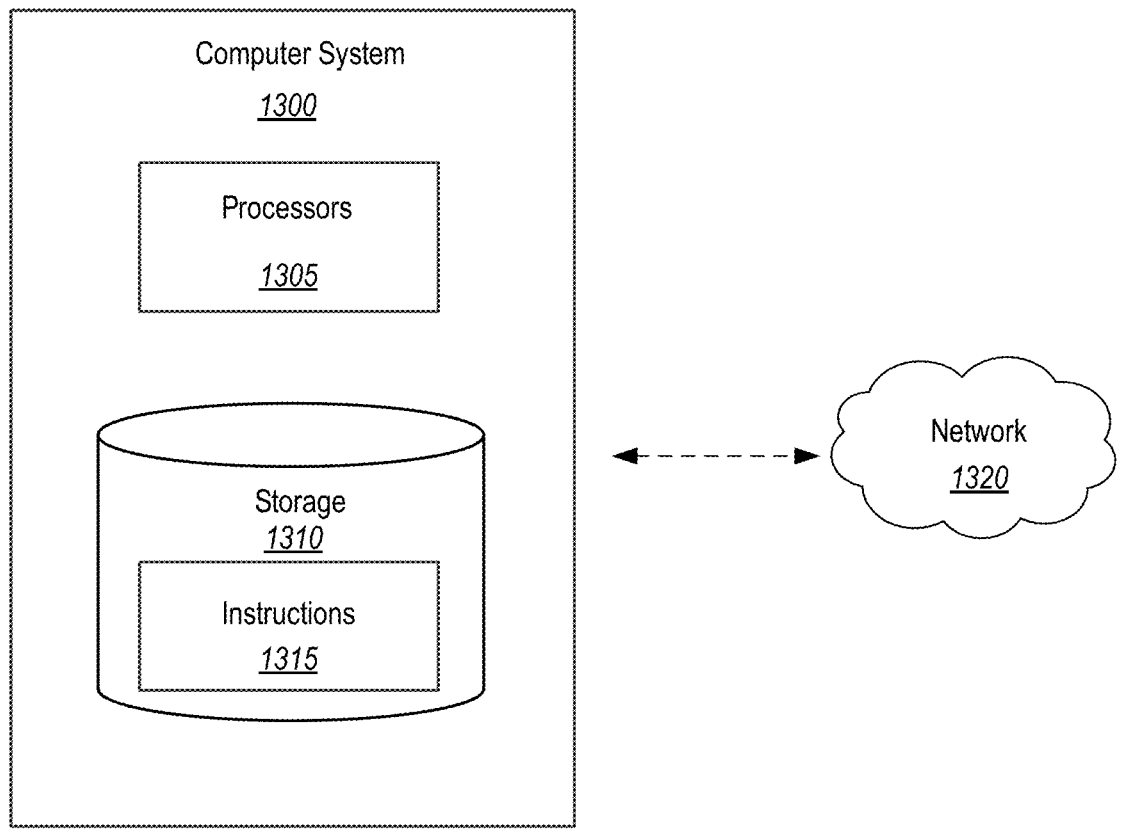
FIG. 13 illustrates an example computing system.

Attention will now be directed to FIG. 13 which illustrates an example computer system 1300 that may include and/or be used to perform any of the operations described herein. Computer system 1300 may take various different forms. For example, computer system 1300 may be embodied as a tablet, a desktop, a laptop, a mobile device, or a standalone device, such as those described throughout this disclosure. Computer system 1300 may also be a distributed system that includes one or more connected computing components/devices that are in communication with computer system 1300.

In its most basic configuration, computer system 1300 includes various different components. FIG. 13 shows that computer system 1300 includes one or more processor(s) 1305 (aka a "hardware processing unit") and storage 1310.

Regarding the processor(s) 1305, it will be appreciated that the functionality described herein can be performed, at least in part, by one or more hardware logic components (e.g., the processor(s) 1305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1300. The different components, modules, engines, and services described herein may be implemented as objects or processors that execute on computer system 1300 (e.g., as separate threads).

Storage 1310 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well.

Storage 1310 is shown as including executable instructions 1315. The executable instructions 1315 represent instructions that are executable by the processor(s) 1305 of computer system 1300 to perform the disclosed operations, such as those described in the various methods.

The disclosed embodiments may comprise or utilize a special-purpose or general-purpose computer including computer hardware, such as, for example, one or more processors (such as processor(s) 1305) and system memory (such as storage 1310), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras) or devices via a network 1320. For example, computer system 1300 can communicate with any number devices or cloud services to obtain or process data. In some cases, network 1320 may itself be a cloud network. Furthermore, computer system 1300 may also be connected through one or more wired or wireless networks to remote/separate computer systems(s) that are configured to perform any of the processing described with regard to computer system 1300.

A "network," like network 1320, is defined as one or more data links and/or data switches that enable the transport of electronic data between computer systems, modules, and/or other electronic devices. As a result of information being transferred, or provided, over a network (either hardwired, wireless, or a combination of hardwired and wireless) to a computer, the computer properly views the connection as a transmission medium. Computer system 1300 will include one or more communication channels that are used to communicate with the network 1320. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
providing a first investigation context and an investigation goal to a large language model system;
receiving from the large language model system, an indication of alternative suggested steps to perform in the investigation, the indication comprising: a description of a first step; specific computer executable code, in a computer programming language, that as a result of being executed performs a skill in the first step, the skill comprising a supplemental access, analytic or enrichment function; and a description of what the computer executable code performs as a result of being executed;

providing a tree interface in a user interface that causes display of the indication of suggested steps in a tree format, wherein the tree format includes an expansion user interface element, that as a result of being selected by a user causes display of the description of the first step; the specific computer executable code that as a result of being executed performs the skill in the first step; and the description of what the computer executable code performs as a result of being executed; and executing the computer executable code thus performing the supplemental access, analytic or enrichment function.

2. The method of claim 1, further comprising:
providing a user interface element that receives investigation context and a user interface element that receives investigation goals; and
receiving the first investigation context at the user interface element that receives investigation context and the investigation goal at the user interface element that receives investigation goals.

3. The method of claim 1, further comprising:
receiving first generated context generated by the large language model system as a result of executing the computer executable code;
providing first cumulative context based on the first generated context and the first investigation context to the large language model system;
receiving from the large language model system, an additional indication of additional suggested steps to perform in the investigation; and
causing display of the additional indication of additional suggested steps in the tree interface as tree branches from an indication of the first step.

4. The method of claim 3, further comprising:
providing the first generated context and the first investigation context to the large language model system;
prompting the large language model system to generate the first cumulative context; and
receiving the first cumulative context from the large language model system.

5. The method of claim 3, further comprising causing display of the first cumulative context in the user interface.

6. The method of claim 3, further comprising performing branch switching by:
receiving user input selecting a second step from the suggested steps, and executing computer executable code for the second step;
receiving second generated context generated by the large language model system as a result of executing the computer executable code for the second step;
providing second cumulative context based on the second generated context and the first context to the large language model system;
receiving from the large language model system, an additional indication of additional suggested steps to perform in the investigation; and
causing display of the additional indication of additional suggested steps in the tree interface as tree branches from the first step.

7. The method of claim 3, wherein executing the computer executable code causes data output to be created, the method further comprising:
storing the data output in a memory associated with the first step;
providing a schema for the data output to the large language model system; and
wherein an indication of a third step in the additional suggested steps comprises third executable code including a reference to the data output generated based on the schema.

8. The method of claim 7, further comprising:
causing the large language model system to generate a query expression to summarize the data output, based on the investigation goal, the first cumulative context, and a schema for the data output; and
executing the query expression, causing the data output to be summarized.

9. The method of claim 1, further comprising providing, to the large language model system, a filtered list of skills and direction, the direction comprising natural language instructions on how the large language model system should analyze the filtered list of skills, first investigation context, and investigation goal.

10. The method of claim 9, further comprising, creating the filtered list of skills by using ontological information from the first investigation context to match ontological context to skills in a broader set of skills.

11. The method of claim 1 further comprising:
providing references to a plurality of different data sets to the large language model system;
providing schemas for the plurality of different data sets to the large language model system;
providing instructions to the large language model system to generate computer executable instructions to manipulate data in the plurality of different data sets; and
wherein the specific computer executable code to perform the skill in the first step comprises references to the data sets in the plurality of different data sets.

12. The method of claim 1 further comprising:
prompting the large language model system to generate a summary for the investigation, including providing context, the investigation goal, entities, and steps executed in the investigation;
receiving from the large language model a summary of the investigation; and
causing display of the summary of the investigation in the user interface.

13. The method of claim 1 further comprising providing instructions to the large language model system to not hallucinate.

14. The method of claim 1 further comprising storing instances of generated context, generated as a result of being steps are executed, in memories for the steps.

15. The method of claim 14, wherein the memories store context as deltas from parent nodes.

16. The method of claim 14, further comprising storing skill outputs for the skills in the memories.

17. The method of claim 14, further comprising storing data table summaries in the memories.

18. A computing system comprising:
a user interface, wherein the user interface comprises a user interface element that receives investigation context and a user interface element that receives investigation goals;

network connection hardware connecting to a large language model, and configured to provide investigation context and investigation goals to the large language model system;

the network connection hardware further configured to receive from the large language model system, an indication of alternative suggested steps to perform in an investigation, the indication comprising: a description of a first step; specific computer executable code, in a computer programming language, that as a result of being executed performs a skill in the first step, the skill comprising a supplemental access, analytic or enrichment function; and a description of what the computer executable code performs as a result of being executed;

the user interface further comprising a tree interface that causes display of the indication of suggested steps in a tree format, wherein the tree format includes a user interface expansion element, that as a result of being selected causes display of the description of the first step; the specific computer executable code to perform the skill in the first step; and the description of what the computer executable code performs as a result of being executed; and the computing system further configured to execute the computer executable code causing the computer system to perform the supplemental access, analytic or enrichment function, as a result of being a user selects the first step.

19. The computing system of claim 18 further comprising storage configured to store, on a step node basis, context generated by executing steps and results of executing steps.

20. Computer readable storage media having stored thereon instructions that are executable by one or more processors to configure a computer system to perform data analysis, including instructions that are executable to configure the computer system to perform at least the following:

provide a first investigation context and an investigation goal to a large language model system;

receive from the large language model system, an indication of alternative suggested steps to perform in the investigation, the indication comprising: a description of a first step;

specific computer executable code, in a computer programming language, that as a result of being executed performs a skill in the first step, the skill comprising a supplemental access, analytic or enrichment function; and a description of what the computer executable code performs as a result of being executed;

provide a tree interface in a user interface that causes display of the indications of suggested steps in a tree format, wherein the tree format includes an expansion user interface element, that as a result of being selected by a user causes display of the description of the first step; the specific computer executable code that as a result of being executed performs the skill in the first step; and the description of what the computer executable code performs as a result of being executed; and execute the computer executable code causing a computer system to perform the supplemental access, analytic or enrichment function.

* * * * *